United States Patent [19]
Longoria, III et al.

[11] 3,819,541
[45] June 25, 1974

[54] POLYALKANOLAMINE RESINS

[75] Inventors: Juan Longoria, III; John A. Cook, both of Lake Jackson, Tex.

[73] Assignee: The Dow Chemical Company, Midland, Mich.

[22] Filed: Apr. 27, 1973

[21] Appl. No.: 355,253

[52] U.S. Cl.......... 260/2 BP, 162/168, 260/29.2 EP
[51] Int. Cl....................... C08g 33/02, C08g 33/06
[58] Field of Search.................... 260/2 BP, 29.2 EP

[56] References Cited
UNITED STATES PATENTS

| | | | |
|---|---|---|---|
| 3,493,502 | 2/1970 | Coscia | 210/54 |
| 3,567,659 | 3/1971 | Nagy | 260/2 |
| 3,655,506 | 4/1972 | Baggett | 162/164 |
| 3,732,173 | 5/1973 | Nagy | 260/2 BP |

Primary Examiner—William H. Short
Assistant Examiner—E. A. Nielsen
Attorney, Agent, or Firm—L. Wayne White; C. E. Rehberg

[57] ABSTRACT

A novel process is herein described for making thermosetting cationic water-soluble resins having improved properties. It comprises reacting (a) a polypropanolamine corresponding to the formula

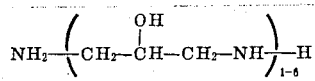

with (b) epichlorohydrin. The process is conducted in an agitated aqueous medium at a temperature of from about 40°–80°C. The polyalkanolamine resins thus formed are wet-strength additives for paper.

5 Claims, No Drawings

POLYALKANOLAMINE RESINS

BACKGROUND OF THE INVENTION

Baggett (U.S. Pat. No. 3,655,506) described certain thermosetting cationic water-soluble resins formed by reacting epichlorohydrin (hereafter epi) with ammonia or aliphatic polyamines in a two-step process. The two-step process comprised the steps of:

a. forming an intermediate resin or prepolymer solution by reacting about 0.3 to 0.7 mole of epichlorohydrin with one atom of reactable amine hydrogen contained in ammonia, an aliphatic polyamine having at least two amine hydrogens per molecule, or mixture thereof in aqueous solution and maintaining the reaction mixture thereby obtained at 0°–100°C. until essentially no unreacted epichlorohydrin remains, and b. reacting the intermediate resin solution thereby formed with about 0.5–1.7 parts by weight of additional epichlorohydrin per part of resin solids in the prepolymer solution at 40°–100°C.

The resins were useful as wet-strength additives for paper.

SUMMARY OF THE INVENTION

A novel process has now been discovered for making thermosetting cationic water-soluble "epi/ammonia" resins having enhanced properties as wet strength additives for paper.

The novel process comprises reacting (a) a polypropanolamine corresponding to the formula $NH_2$–$(CH_2$–$CH(OH)$–$CH_2$–$NH)_n$$H$, wherein $n$ is from 1 to 6 (preferably 1 to 3, most preferably 1) with (b) epichlorohydrin in a ratio of from about 0.7 to about 1.2 moles of (b) per amine hydrogen equivalent of (a). The process is conducted in an agitated aqueous medium at a reaction temperature of from about 40°C to about 80°C. The resins thus prepared have a narrower molecular weight distribution, and generally have superior wet-strength properties in paper when compared to those prepared by reacting epi and ammonia in the Baggett process at comparable loading levels.

The instant process can be conducted as a one-step or two-step process.

The instant one-step process is conducted by continuously metering the epi into the agitated reaction mixture over a time span of from about 3 to about 7 hours. By "continuously metering" is meant that the epi is charged to the reaction mixture in a continuous steady stream or in a plurality of small increments (e.g., dropwise or other small aliquots) at an essentially constant rate.

The instant two-step process comprises the steps of:

1. forming a prepolymer by reacting from about 0.3 to about 0.5 moles of epi per amine hydrogen equivalent weight of polyalkanolamine, and 2. further reacting the prepolymer thus formed with the balance of the epi (i.e. from about 0.2 to about 0.9 moles of epi per amine hydrogen equivalent weight of said prepolymer). In each step it is advantageous to meter epi into the reaction mixture in a slow, continuous manner.

The reaction of the epi with the polypropanolamine is exothermic. Therefore, as a matter of practicality, the epi is metered into the reaction mixture in both the one-step and two-step processes at a rate sufficient to maintain the reaction mixture at a temperature of from about 40° to about 80°C.

Normally the reaction is essentially complete in from about 5 to 20 hours, depending upon the reaction temperature used. To assure complete reaction, however, the reaction is advantageously "finished" by warming the reaction mixture at a temperature of from about 70°–80°C for about 1 to 2 hours after the exotherm has ceased.

In both of the above embodiments of the instant process, the reaction is conducted in an agitated aqueous medium. The mechanical means to provide such agitation can be varied to convenience (e.g. stirring, swirling, etc.). Efficient blending of the reaction components in the aqueous medium provides a more uniform product. The concentration of the reactants and/or resin product in the aqueous medium is advantageously selected between about 15 to about 30 weight percent, total weight basis.

The reactants in this process are well known. Epi is commercially available and the polypropanolamine reactants are normally produced by reacting epi with excess ammonia and purified by distillation under reduced pressure. Mixtures of 1,3-diamino-2-propanol and oligomers thereof having from 2 to 6 mer units can be used. Preferred polypropanolamine reactants are 1,3-diamino-2-propanol and oligomeric mixtures which are predominantly monomer, dimer and/or trimer thereof.

The resins here produced are utilized as wetstrength additives in paper in substantially the same manner as the epi/ammonia resins described by Baggett. Namely, they are added to aqueous paper pulp slurries in amounts of from about 0.1 to 5 weight percent of resin solids, based on the dry weight of the pulp. After blending the aqueous resin solution into the pulp, the treated pulp is used in conventional paper making equipment. The paper heat drying cycle converts the resin into a cross-linked insoluble solid which imparts considerable wet-strength to the treated paper.

Preparation of the Polypropanolamine Reactant:

The polypropanolamine reactant was prepared by slowly adding epi (489.6 g.; 5.4 moles) ammonium hydroxide (3300 g.; 54.3 moles of $NH_3$) over a 7-hour period during which the reaction mixture was maintained at 15°–25°C with efficient stirring and external cooling. The reaction mixture was maintained at room temperature with stirring for an additional 17 hours. Excess ammonia and water were then stripped from the crude reaction product under reduced pressure and the residue filtered. Analysis: 33.9% nonvolatile solids; 9.1% ionic chloride; 0.1% $NH_3$; 5.92% total nitrogen; and an amine hydrogen equivalent weight of 164. Gel permeation chromatography showed the product to be 30% monomer ($NH_2$–$CH_2$–$CH(OH)$–$CH_2$–$NH_2$), 26% dimer ($NH_2$–$(CH_2$–$CH(OH)$–$CH_2$–$NH)_2$$H$) and about 44% higher oligomers (trimers, tetramers, pentamers and/or hexamers). This mixture will hereafter be referred to as "crude diaminopropanol."

Other runs were similarly conducted using other ratios of epi/ammonia. The results are shown in Table I below:

TABLE I

| Molar Ratio $NH_3$/epi | Monomer (%) | Dimer (%) | Higher Oligomers (%) |
|---|---|---|---|
| 40 | 70 | 21 | 9 |
| 15 | 40 | 28 | 32 |
| 10 | 30 | 26 | 44 |
| 5 | 19 | 17 | 64 |

Essentially pure 1,3-diamino-2-propanol was obtained from the crude reaction products above by distillation under reduced pressure. EXAMPLES 1–3 — The One-Step Embodiment:

A sufficient amount of "crude diaminopropanol" to give 0.5 amine hydrogen equivalent weight (AHEW) of polyalkanolamine reactant was diluted with water to 25 percent solids and sufficient NaOH was added to neutralize the ionic chloride. The resulting aqueous solution was warmed to 60°–65°C and epi (48.6 g.; 0.53 moles) added dropwise over a 3-hour period with stirring. The resulting mixture was warmed for an additional hour at 70°C and cooled to room temperature. The reaction mixture was extracted once with an equal volume of methylene chloride to remove any 1,3-dichloro-2-propanol by-product. The finished product was thus obtained as an aqueous solution having 20.1 percent non-volatile solids and 3.8 percent inorganic salts.

Other resins were similarly prepared using other epi/AHEW ratios of reactants. They were all evaluated as wet-strength additives in paper as follows:

Unbleached Kraft pulp was beaten to a Canadian Standard Freeness (TAPPI Method T227M-58) of 500 ml. in a Nobel and Wood beater. The pulp was diluted to 0.25 percent solids and the pH adjusted to 7.5. The desired amount of resin was blended with the test pulp slurry for 1 minute and then sheets were formed on a British hand sheet machine (TAPPI Method T205M-58). The test sheets were dried at 105°C for 60 sec. and then cured for 1 hour at 105°C. After conditioning at room temperature, the test sheets were soaked in water for 2 hours before measuring the burst strength on a Mullens tester by TAPPI Method T403M-58.

The wet-burst strength data are summarized in Table II.

TABLE II

| Example | Epi/AHEW | Resin Loading (lbs/ton of pulp) | Strength (lbs/in²) |
|---|---|---|---|
| 1 | 0.70 | 5 | 10.9 |
|  |  | 10 | 20.3 |
|  |  | 15 | 21.3 |
| 2 | 0.82 | 5 | 11.5 |
|  |  | 10 | 21.4 |
|  |  | 15 | 26.0 |
| 3 | 1.05 | 5 | 15.4 |
|  |  | 10 | 26.6 |
|  |  | 15 | 29.7 |

EXAMPLE 4 — The Two-Step Embodiment:

The "crude diaminopropanol" (100 g.; 164 AHEW; 5.92 percent nitrogen) was diluted with water (141 g.) and the ionic chloride neutralized with solid sodium hydroxide (10.3 g.). This mxiture was warmed to 35°–42°C and epi (30.7 g.; 0.33 moles) added dropwise thereto over a 1-hour period with continuous stirring. The resulting mixture was warmed with continuous stirring for 2 hours at 70°C. An aqueous solution of a prepolymer was thus obtained containing 24.6 percent non-volatile solids.

The prepolymer solution (200 g.) was diluted with water (85 g.) and warmed to 35°–42°C. Epi (27.5 g.; 0.30 moles) was added dropwise thereto over a 2-hour period. The reaction mixture was subsequently warmed with continuous stirring for 1 hour at 75°C and cooled. The resin was thus obtained as an aqueous solution having 19.0 percent non-volatile solids. It was evaluated as a wet-stregth solid as per examples 1–3 above and gave strength values of 14.4; 24.9; and 27.7 lbs/inch² at loading levels of 5, 10 and 15 lbs/ton of pulp (dry weight basis), respectively.

Other crude diaminopropanols (e.g., those in Table I) can obviously be similarly prepared and used within the scope of the invention defined above.

EXAMPLES 5–9 — The Two-Step Embodiment of the Process Using Epi/1,3-Diamino-2-Porpanol:

Various other resins were prepared using essentially the same procedure and test conditions detailed in Example 4 except that substantially pure 1,3-diamino-2-propanol (0.22 moles) was used in place of "crude diamino-propanol." These resins were evaluated as wet-strength paper additives as per Example 1. The data are summarized in Table III.

TABLE III

| Ex. | Moles Epi Step 1 | Used Step 2 | Molar Ratio Epi/AHEW | Resin Loading (lbs/ton pulp) | Strength (lbs/in²) |
|---|---|---|---|---|---|
| 5 | 0.29 | 0.39 | 0.77 | 5 | 9.1 |
|  |  |  |  | 10 | 21.9 |
|  |  |  |  | 15 | 23.9 |
| 6 | 0.35 | 0.46 | 0.92 | 5 | 11.6 |
|  |  |  |  | 10 | 21.7 |
|  |  |  |  | 15 | 23.9 |
| 7 | 0.45 | 0.54 | 1.12 | 5 | 8.1 |
|  |  |  |  | 10 | 20.0 |
|  |  |  |  | 15 | 24.2 |
| 8 | 0.54 | 0.61 | 1.32 | 5 | 5.8 |
|  |  |  |  | 10 | 10.0 |
|  |  |  |  | 15 | 16.3 |
| 9 Ref. Resin from U.S. 3,655,506 (epi/NH₃) |  |  |  | 5 | 6.9 |
|  |  |  |  | 10 | 20.7 |
|  |  |  |  | 15 | 25.4 |

Examples 8 and 9 are not included within the scope of the instant invention and are presented merely for comparison. From this comparison it is seen that polypropanolamine resins prepared in accordance to the instant process are superior to those prepared by the prior art at low loading levels. This is of commercial significance to the paper industry.

We claim:

1. A process for making a thermosetting cationic water-soluble resin which comprises reacting by contacting in an agitated aqueous medium
   a. a polypropanolamine corresponding to the formula

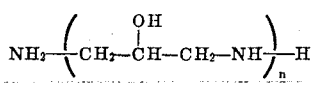

wherein $n$ is from 1 to 6, with
   b. epichlorohydrin
in a ratio of from about 0.7 to about 1.2 moles of (b) per amine hydrogen equivalent weight of (a); the concentration of (a) and (b) in said aqueous medium being from about 15 to about 30 weight percent, total weight basis, and the reaction temperature being from about 40°C to about 80°C.

2. The process defined by claim 1 wherein (b) is continuously metered into the reaction mixture over a time span of from about 3 to about 7 hours.

3. The process defined by claim 1 comprising the steps of:
   1. forming a prepolymer by reacting (a) with (b) in a ratio of from about 0.3 to about 0.5 moles of (b) per amine hydrogen equivalent weight of (a), and
   2. further reacting said prepolymer with from about 0.2 to about 0.9 moles of (b) per amine hydrogen equivalent weight of said prepolymer.

4. The process defined by claim 1 wherein $n$ is from 1 to 3.

5. The process defined by claim 4 wherein $n$ is 1.

* * * * *